United States Patent
Bornier et al.

(10) Patent No.: US 8,606,276 B2
(45) Date of Patent: Dec. 10, 2013

(54) TELECOMMUNICATIONS APPARATUS AND METHOD

(75) Inventors: Raynald Bornier, Issy-les-Moulineaux (FR); Jean-Louis Fuccellaro, London (GB)

(73) Assignee: France Telecom, Paris (FR)

( * ) Notice: Subject to any disclaimer, the term of this patent is extended or adjusted under 35 U.S.C. 154(b) by 868 days.

(21) Appl. No.: 12/093,246

(22) PCT Filed: Nov. 7, 2006

(86) PCT No.: PCT/EP2006/068195
§ 371 (c)(1),
(2), (4) Date: May 9, 2008

(87) PCT Pub. No.: WO2007/054501
PCT Pub. Date: May 18, 2007

(65) Prior Publication Data
US 2008/0280612 A1    Nov. 13, 2008

(30) Foreign Application Priority Data
Nov. 10, 2005  (EP) .................................. 05292397

(51) Int. Cl.
*H04W 36/00*   (2009.01)

(52) U.S. Cl.
USPC ............ 455/437; 455/436; 455/438; 370/331

(58) Field of Classification Search
USPC ........................... 455/436–444; 370/331–337
See application file for complete search history.

(56) References Cited

U.S. PATENT DOCUMENTS

| | | | |
|---|---|---|---|
| 2003/0169725 A1* | 9/2003 | Ahmavaara et al. | 370/352 |
| 2004/0246990 A1* | 12/2004 | Krishnamurthi et al. | 370/466 |
| 2005/0119005 A1* | 6/2005 | Segal et al. | 455/445 |
| 2005/0130659 A1* | 6/2005 | Grech et al. | 455/436 |
| 2005/0138178 A1* | 6/2005 | Astarabadi | 709/227 |
| 2006/0111115 A1* | 5/2006 | Marin et al. | 455/442 |
| 2007/0159976 A1* | 7/2007 | Dekeyzer et al. | 370/236 |

FOREIGN PATENT DOCUMENTS

EP    1551144 A1    7/2005

* cited by examiner

*Primary Examiner* — Nathan Taylor
(74) *Attorney, Agent, or Firm* — Westman, Champlin & Koehler, P.A.; David D. Brush

(57) ABSTRACT

A telecommunications system provides mobile communications to mobile user equipment and includes an internet protocol access network and a cellular mobile radio network. The mobile user equipment activates a connection on the cellular mobile radio network using the packet switched communications channel whilst receiving a communications service via the internet protocol access network. The mobile user equipment communicates via the connection on the packet-switched channel of the cellular mobile radio network in response to a handover event from the internet protocol access network to the cellular mobile radio network. The mobile user equipment also establishes a connection on the cellular mobile radio network using the circuit switched channel in response to the handover event, continues to communicate via the connection on the packet-switched channel while the connection on the circuit-switched channel has been established, and then communicates via the connection on the circuit-switched channel once it has been established.

8 Claims, 10 Drawing Sheets

TELECOMMUNICATIONS APPARATUS AND METHOD

CROSS-REFERENCE TO RELATED APPLICATIONS

This Application is a Section 371 National Stage Application of International Application No. PCT/EP2006/068195, filed Nov. 7, 2006, which is incorporated by reference in its entirety and published as WO 2007/054501 on May 18, 2007, in English.

FIELD OF THE INVENTION

The present invention relates to telecommunications apparatus and methods operable to facilitate the hand-over of a call from an internet protocol access network to a cellular mobile radio network. The present invention also relates to a mobile user equipment.

BACKGROUND OF THE INVENTION

Mobile telecommunications networks are arranged to provide a facility for communicating to and from a user equipment (UE) within a coverage area of the network for wireless communications. A user equipment can be within the coverage area of more than one network at the same time, and a communications session provided to a user equipment over a first network may need to be re-routed, or handed over, to the user equipment via a second network if the user equipment leaves the coverage area of the first network. For instance, a short-range wireless network may have a coverage area which is a subset of a coverage area of a cellular radio network and may provide greater bandwidth communications than the cellular radio network. In this case, a user equipment present in the short-range wireless network may preferentially use the short-range wireless network to benefit from the greater bandwidth provided. However, if the user equipment were to exit the coverage area of the short-range wireless network, a communications session commenced in the short-range wireless network can be continued in the cellular radio network by providing a hand-over of the communications session. In some circumstances such a hand-over can be performed without any serious interruption to the communications session. However, in other circumstances an interruption in service may result or the communications session may even be dropped.

SUMMARY OF INVENTION

According to an aspect of the present invention there is provided a telecommunications system for providing mobile communications to mobile user equipment. The system comprises an internet protocol access network and a cellular mobile radio network. The internet protocol access network provides a facility for mobile communications to mobile user equipment within a coverage area for wireless communication provided by the internet protocol access network, and these mobile communications are provided using an internet protocol. The cellular mobile radio network provides a facility for mobile communications to mobile user equipment within a coverage area for wireless communication provided by the cellular mobile radio network. The mobile communications are provided using at least one of a packet switched communications channel and a circuit switched communications channel. In the packet switched communications channel data is divided into packets and communicated on a communications bearer shared with other data packets. In the circuit switched communications channel data is communicated on a communications channel having a dedicated bandwidth. The system also comprises a mobile user equipment which is operable to activate a connection on the cellular mobile radio network using the packet switched communications channel whilst receiving a communications service via the internet protocol access network. The mobile user equipment communicates via the connection on the packet-switched channel of the cellular mobile radio network in response to a handover event for changing affiliation of the mobile user equipment from the internet protocol access network to the cellular mobile radio network. The mobile user equipment also establishes a connection on the cellular mobile radio network using the circuit switched channel in response to the handover event, and continues to communicate via the connection on the packet-switched channel while the connection on the circuit-switched channel is being established. Once the circuit-switched channel has been established, the mobile user equipment communicates via the connection on the circuit-switched channel.

Accordingly, by temporarily using the packet-switched channel of the cellular mobile radio network while the circuit-switched channel is being established, improved continuity of service can be provided and the incidence of dropped calls can be reduced.

A hand-over event may be for example one of the mobile user equipment or the access network to which it is currently affiliated detecting that communications may be more efficiently conducted via another access network, for instance because the mobile user equipment is losing the radio coverage of the access network to which it is currently affiliated.

Embodiments of the present invention can provide a facility for improving service continuity when a hand-over is performed from an internet protocol access network to a cellular mobile radio network. The cellular mobile radio network may be for example a Universal Mobile Telecommunications System (UMTS) network providing longer range and larger coverage than a shorter range internet protocol access network which may be for example a WiMAX or WiFi wireless local area network (WLAN). The cellular mobile radio network is therefore arranged to provide mobility to the mobile user equipment in which the mobile user equipment can move throughout a coverage area provided by base station transceivers (known as Node Bs in UMTS), handing over from one base station to another in order to maintain communications. The internet protocol wireless access network may provide a short range communications facility within so called wire-less "hot spots", with a communications bandwidth which is typically higher than that of the cellular mobile radio network.

As those familiar with mobile communications technology will appreciate, some cellular mobile radio networks such as GSM (referred to as 2G networks) are able to provide a circuit switched communications channel to mobile user equipment, providing a dedicated bandwidth to the mobile user equipment for communicating data to provide a communications service. Other cellular networks such as those operating in accordance with GPRS or UMTS are able to support packet data communications in which data is communicated in packets, which are multiplexed with data packets from other mobile user equipment and sources via a common communications bearer. A packet data connection established via the cellular network can therefore support internet protocol communications. Furthermore, bandwidth is not consumed by a mobile user equipment unless data packets are communicated. It is desirable to use a circuit switched communications channel rather than a packet switched communications channel because the circuit switched communications channel provides better quality for voice communications, is cheaper for the operator, and may be the only choice in terms of coverage.

Embodiments of the present invention are arranged to provide a facility for a mobile user equipment to hand-over between an internet protocol access network and a cellular mobile radio network, in which continuity of a communications service is improved by reducing a likelihood of losing data packets. For time sensitive services such as voice or video communications, then improvement in continuity is particularly useful. To provide the improvement in the continuity of communications, a connection is provided in a packet switched communications channel of a cellular mobile radio network which is established concurrently with or before a communications service is established via an internet protocol access network. Since the connection established with the cellular mobile radio network is for a packet switched channel, a bandwidth available for communications on the cellular mobile radio network is not consumed until a data packet is communicated. As such no bandwidth is consumed whilst the mobile user equipment is communicating via the internet protocol access network. However, in the event of a loss of connection with the internet protocol access network, data packets may be communicated via the packet switched connection provided by the cellular mobile radio network. The loss of connection may be as a result of the mobile user equipment moving out of a coverage area or losing sharply the radio signal provided by the internet protocol access network. For some applications such as a 3G video call or voice communications, the packet switched connection may provide sufficient continuity until a circuit switched communications channel can be established in order to maintain communications.

In one example the mobile user equipment controls the communication via the packet data communications channel and the establishment of the circuit switched communications channel in response to a hand-over event. To this end, the mobile user equipment may be provided with a protocol stack which can be used to tear-down an internet protocol communications channel via which the mobile user equipment receives a communications session from the internet protocol access network. The mobile user equipment can thereby tear-down the internet protocol communications session which was established via the internet protocol communications channel, and communicate signalling data with a media gateway controller to tear-down the communications channel established via the packet data gateway of the WLAN to the UMTS network.

In one example, and in particular if a correspondent node to which a communications session has been established is within the circuit switched network, data communicated using internet packets is routed through a media gateway, so that a correct internet protocol session can be identified for routing internet protocol packets (IP packets) to the correspondent node. The media gateway is controlled by a media gateway controller provided in an IP core network. Signalling data such as SIP messages are communicated to the media gateway controller which responds to the messages which are communicated for controlling the communications session to configure the media gateway in accordance with the messages.

In one example the correspondent node is attached to an IP network, and therefore before the handover the call is voice-over IP, and after the handover the call is routed through the media gateway. In another example the correspondent node is attached to the cellular or public switched telephone network (PSTN), in which case before the handover, the call is routed through the media gateway, because the user equipment is initially present in an IP network, and after the handover, the call is a circuit switched call and is not routed through the media gateway.

Whilst the packet switched communications channel and the circuit switched communications channel could be established using the radio network infrastructure and common core network infrastructure, they could be provided using separate radio network and/or core network infrastructure.

Various further aspects and features of the present invention are defined in the appended claims and include a mobile user equipment and a telecommunications method.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF PREFERRED EMBODIMENTS

Figure 1A:
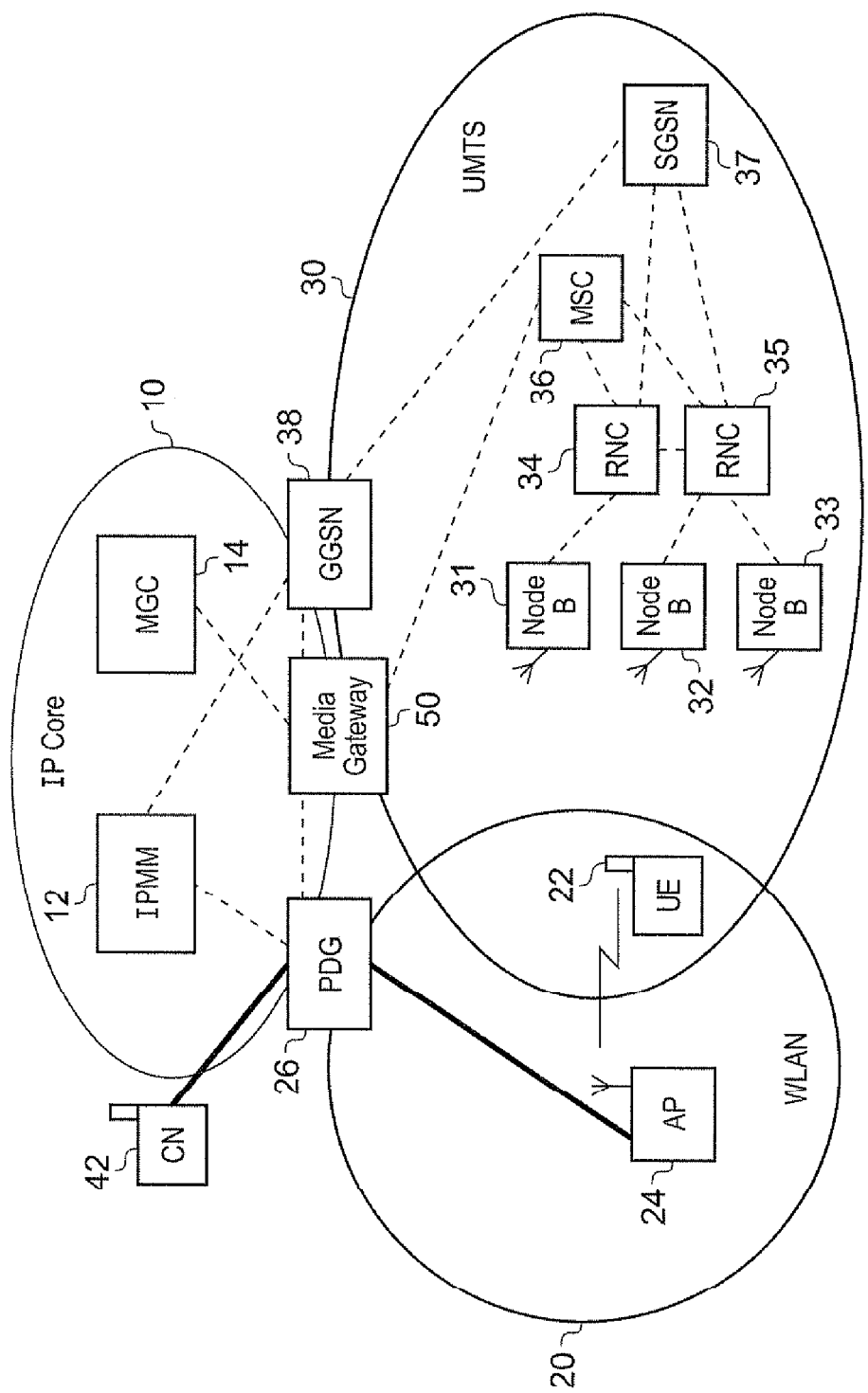
FIG. 1A schematically illustrates a telecommunications system according to an embodiment of the present invention prior to a hand-over from one access network to another access network.

Referring to FIG. 1A, a telecommunications system is shown to comprise an internet protocol (IP) core network 10, a wireless local area network (WLAN) 20, and a UMTS network 30. The wireless local area network provides local area networking via, for example, a radio link. The UMTS network provides wide area communications via both packet-switched and circuit-switched channels. The IP core network 10 controls internet protocol communications between mobile user equipment affiliated with the attached access networks. In particular, in the present example the IP core network 10 controls internet protocol communications between a User Equipment (UE) 22 which is within the coverage areas of both the WLAN 20 and the UMTS network 30 and a correspondent node (CN) 42 which is affiliated with an IP communications network (not shown). In FIG. 1A, the communications links between the various network elements which communicate media data between the user equipment 22 and the correspondent node 42 are illustrated by solid lines. In contrast, communications links not used to communicate media data between the user equipment 22 and the correspondent node 42, which includes communication links which communicate signalling data rather than media data, are illustrated by dashed lines. It can therefore be seen that the user equipment 22 is able to communicate with the correspondent node 42 via the WLAN 20. Specifically, the user equipment 22 can transmit data to and receive data from an access point (AP) 24 over a radio link. The access point 24 is in communication with a packet data gateway 26 which can communicate signalling messages to the IP core network 10, in particular to an internet protocol mobility manager 12 in the IP core network 10, and can communicate media data between the user equipment 22 and external networks, and in particular to the correspondent node 42.

The IP core network 10 is able to control a media gateway 50 using a media gateway controller (MGC) 14. In FIG. 1A, the user equipment 22 is not currently communicating using the UMTS network 30, and therefore the network elements and their interconnections are shown using dashed lines. A Node B 31, a Node B 32 and a Node B 33 are shown and are operable to communicate with a mobile user equipment within their coverage area via a radio link. A radio network controller (RNC) 34 is arranged to control communications using the Node B 31 and a radio network controller 35 is arranged to control communications using the Node B 32 and the Node B 33.

Data being communicated to or from a mobile user equipment in radio contact with one of the Node Bs will be communicated via a respective RNC 34, 35 to either a Mobile Switching Centre (MSC) 36 or a Serving GPRS Support Node (SGSN) 37 depending on whether a circuit switched communications channel or a packet switched communications channel is being used to support a communications session. In particular, when a packet switched communications channel is used, the data being communicated to and from a mobile user equipment is routed via the SGSN 37 to a Gateway GPRS Support Node (GGSN) 38 and then on to the media gateway 50. Alternatively, when a circuit switched communications channel is used, the data being communicated to and from a mobile user equipment is routed via the MSC 36 to the media gateway 50.

Figure 1B:
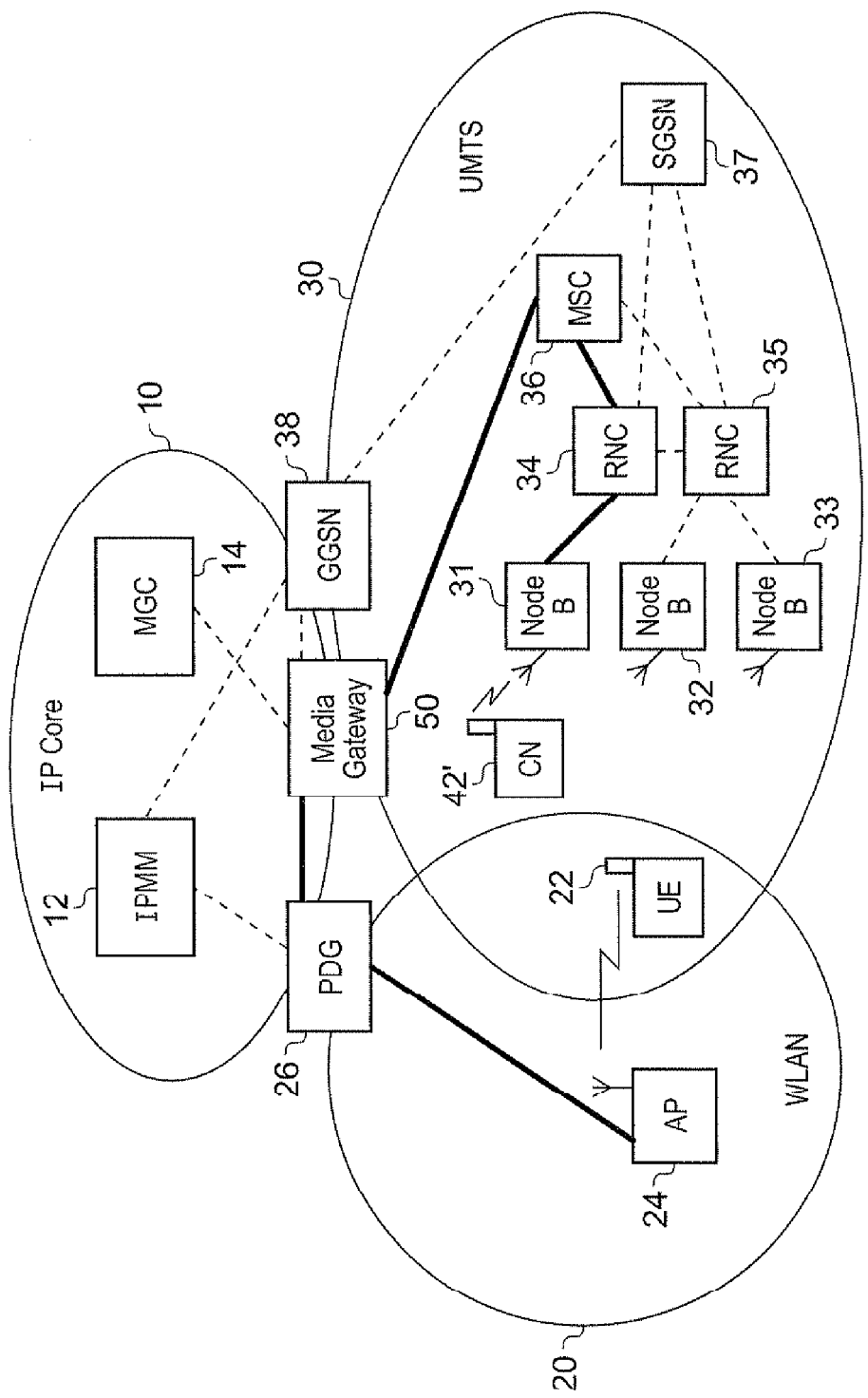
FIG. 1B schematically illustrates a telecommunications system according to another embodiment of the present invention prior to a hand-over from one access network to another access network.

Referring to FIG. 1B, the telecommunications system of FIG. 1A is shown, but with the correspondent node 42 of FIG. 1A being replaced with a correspondent node 42' which is present in, and affiliated to, the UMTS network 30 as shown in the diagram. Alternatively, the correspondent node could be part of a public switched telephone network (PSTN). Accordingly, media data is communicated from the packet data gateway 26 to the media gateway 50 via the IP core network 10. The media data is then communicated from the media gateway 50 to the correspondent node 42' via the MSC 36, the RNC 34 and the Node B 31.

Figure 2A:
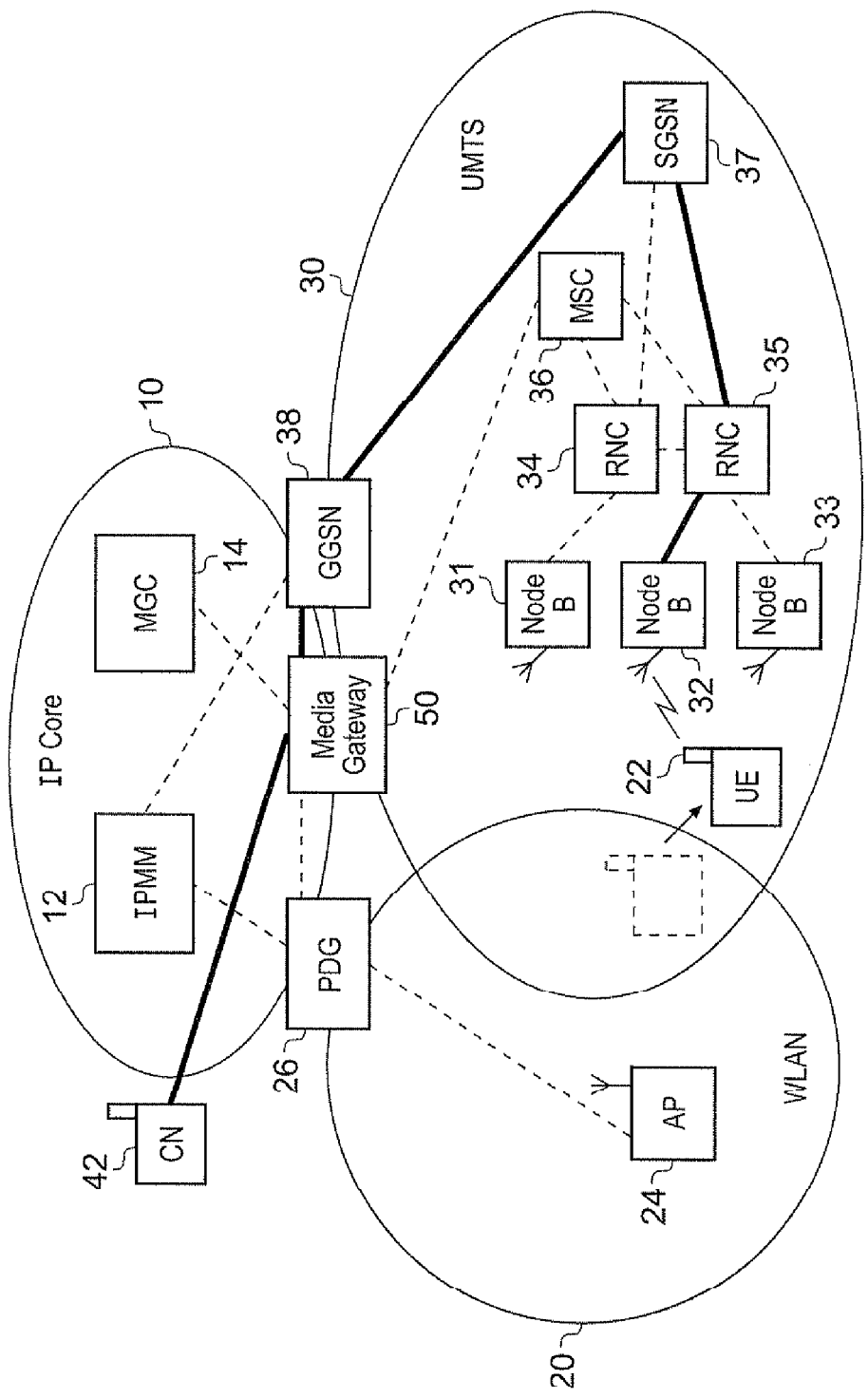
FIG. 2A schematically illustrates the telecommunications system of FIG. 1A during the hand-over procedure.

Referring to FIG. 2A, the telecommunications system of FIG. 1A is illustrated for a state in which a hand-over of the communications session between the user equipment 22 and the correspondent node 42 from the WLAN 20 to the UMTS network 30 is occurring, with corresponding features of FIG. 1A and FIG. 2A being provided with the same reference numerals. It can be seen from FIG. 2A that the user equipment 22 is no longer within the coverage area of the WLAN 20. The user equipment 22 is now served only by the UMTS network 30. As illustrated by a solid line in FIG. 2, media data is communicated between the various network elements between the user equipment 22 and the correspondent node 42, and therefore follows a different route from that illustrated in FIG. 1A. In particular, while in FIG. 1A media data was communicated to the media gateway and onwards to the correspondent node 42 via an access point 24 and a packet data gateway 26, this signal path is no longer used by the mobile user equipment 22, and so the media data is communicated instead over the UMTS network 30. The UE 22 is in radio contact with the Node B 32 which operates under the control of the RNC 35. During the hand-over procedure, media data is communicated between the user equipment 22 and the media gateway 50 via the SGSN 37 and the GGSN 38.

Control of the hand-over procedure will now be described. When the user equipment 22 moves out of the coverage area of the WLAN 20, the UE 22 will communicate a message indicating the loss to the IPMM 12 of the IP core 10. The UE 22 or the IPMM 12, by issuing control signals to the UE 22, will then initiate the hand-over procedure from the WLAN to the UMTS network so that the MGC routes the communication session to the media gateway 50 via the UMTS network. In FIG. 2A, the communications session is provided by a packet-switched communications channel of the UMTS network 30, and in particular is routed to the media gateway (if the correspondent node is in the internet protocol access network) via the SGSN and GGSN, which are packet switched elements of the UMTS network 30. A time required to transfer data on an already PDP context-activated UMTS packet switched session is very small, and so comparatively uninterrupted service can be provided. This is because the packet switched communications channel is always "on" but not used unless data is actually being sent.

Figure 2B:
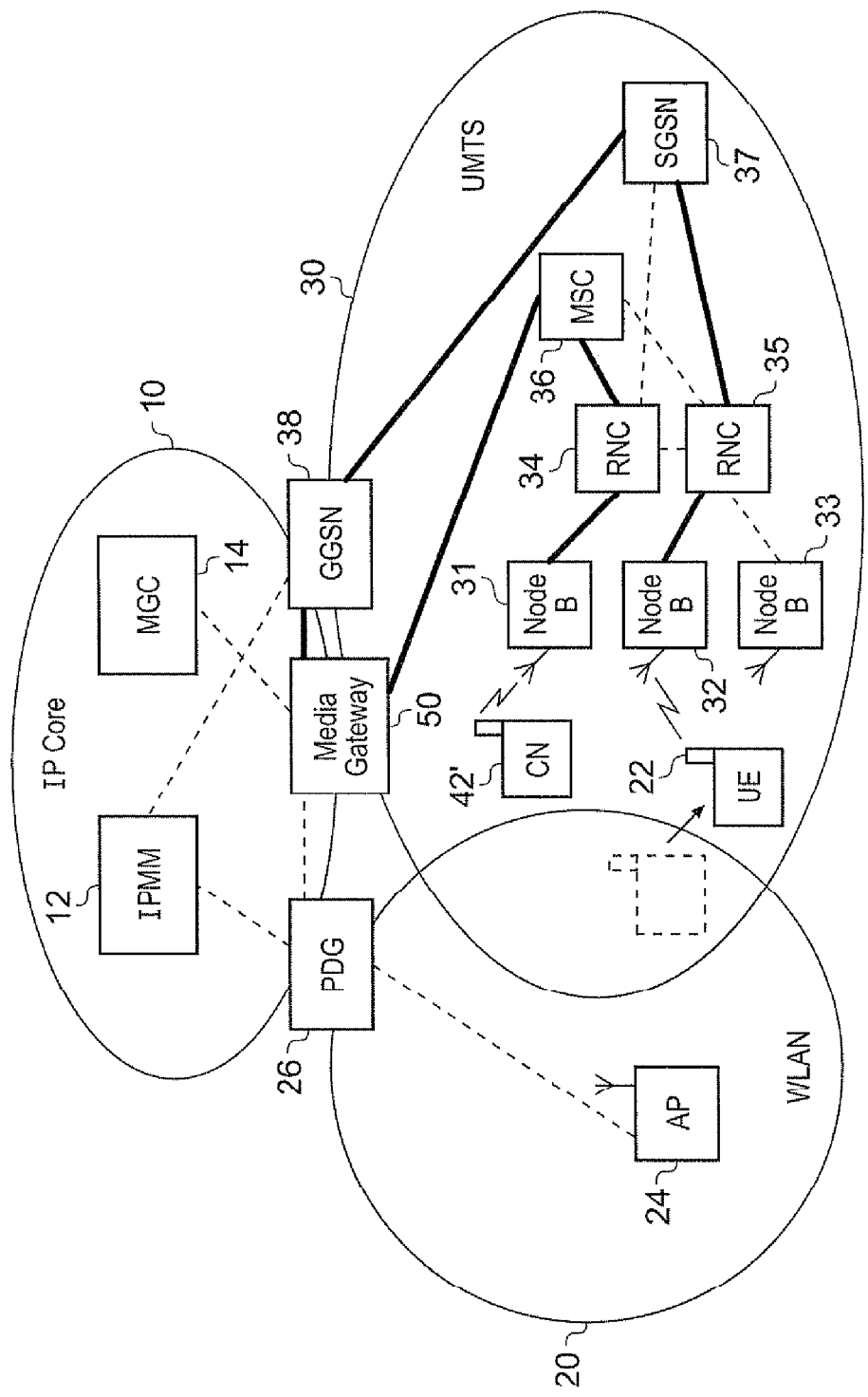
FIG. 2B schematically illustrates the telecommunications system of FIG. 1B during the hand-over procedure FIG. 3A schematically illustrates the telecommunications system of FIGS. 1B and 2B after the hand-over procedure has been completed.

Referring to FIG. 2B, the telecommunications system of FIG. 2A is shown, but with the correspondent node 42 of FIG. 2A being replaced with a correspondent node 42' which is present in, and affiliated to, the UMTS network 30. That is, FIG. 2B illustrates the telecommunications system of FIG. 1B for a state in which a hand-over of the communications session between the user equipment 22 and the correspondent node 42 from the WLAN 20 to the UMTS network 30 is occurring. Media data in this case is communicated between the UE 22 and the correspondent node 42' via the node B 32, the RNC 35, the SGSN 37, the GGSN 38, the media gateway 50, the MSC 36, the RNC 34 and the Node B 31.

Figure 3A:
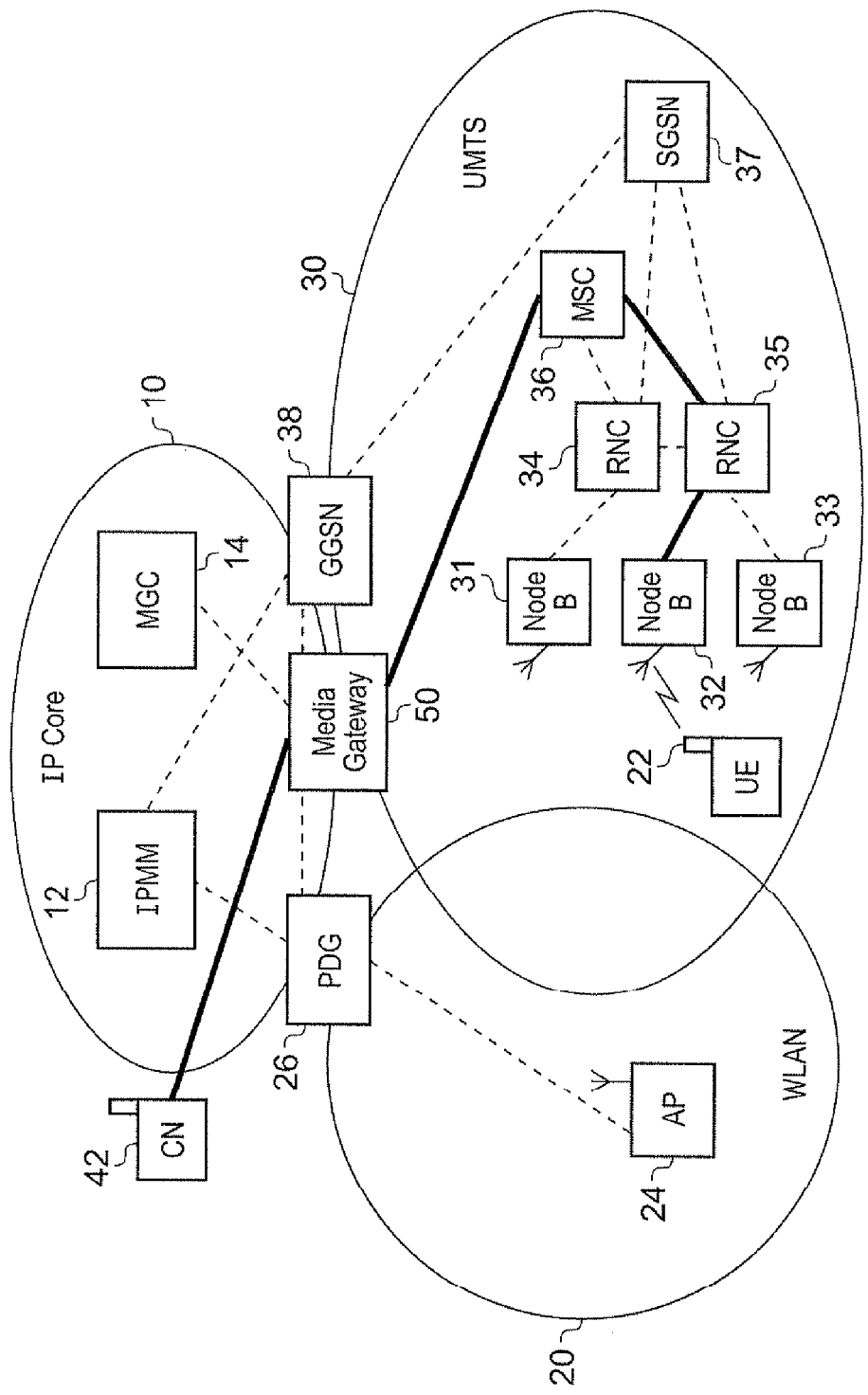
FIG. 3B schematically illustrates the telecommunications system of FIGS. 1B and 2B after the hand-over procedure has been completed.

Referring to FIG. 3A, the telecommunications system illustrated in FIGS. 1A and 2A is illustrated for a state in which a hand-over of the communications session between the user equipment 22 and the correspondent node 42 from the WLAN 20 to the packet-switched interface of the UMTS network 30 has been completed, with corresponding features being provided with the same reference numerals. As with FIG. 2A, the communications session is provided using the UMTS network 30, but is now provided using a circuit switched channel rather than a packet switched channel. Accordingly, signalling data and media data continue to be communicated over the radio link between the user equipment 22 and the Node B 32 under the control of the RNC 35, but in FIG. 3A, rather than communicating via the SGSN and GGSN, the MSC 36 is used instead to provide a circuit switched communications channel to the media gateway 50. Typically, the time required to set up this circuit switched communication channel will be approximately 4 to 6 seconds. The set up procedure is commenced along with the initial hand-over from the WLAN 20 to the packet-switched interface of the UMTS network 30, and until the set up procedure is completed and the circuit switched channel is established, communication between the user equipment 22 and the correspondent node 42 will be provided by the packet switched communication channel as illustrated in FIG. 2A. As with FIG. 2A, control of the media gateway to route media data between the UMTS network 30 and the correspondent node 42, if it is in the internet protocol access network, is provided the MGC 14. Comparison of FIGS. 2A and 3A reveals that much of the network infrastructure for the packet switched and circuit switched channels of the UMTS network are the same. In the example of FIGS. 2A and 3A only the use of the SGSN 37 and the GGSN 38 is dependent on whether a packet switched or circuit switched communications channel is being used. Other elements are common to communications on either the packet switched or circuit switched communications channel.

It will be appreciated that while the correspondent node 42 in FIGS. 1A to 3A is not affiliated with either of the WLAN 20 or the UMTS network 30, it could equally be provided in either of these networks. If the correspondent node were to be present in the same or another internet protocol access network then calls would be managed inside the internet protocol access network without a need to communicate via the media gateway 50 when the user equipment 22 is present in the WLAN coverage area. If the correspondent node were to be present in the UMTS network 30 then calls would be managed within the UMTS network 30 when the user equipment has moved out of the WLAN coverage area. This latter scenario is that which is illustrated by FIGS. 1B, 2B and 3B.

Figure 3B:
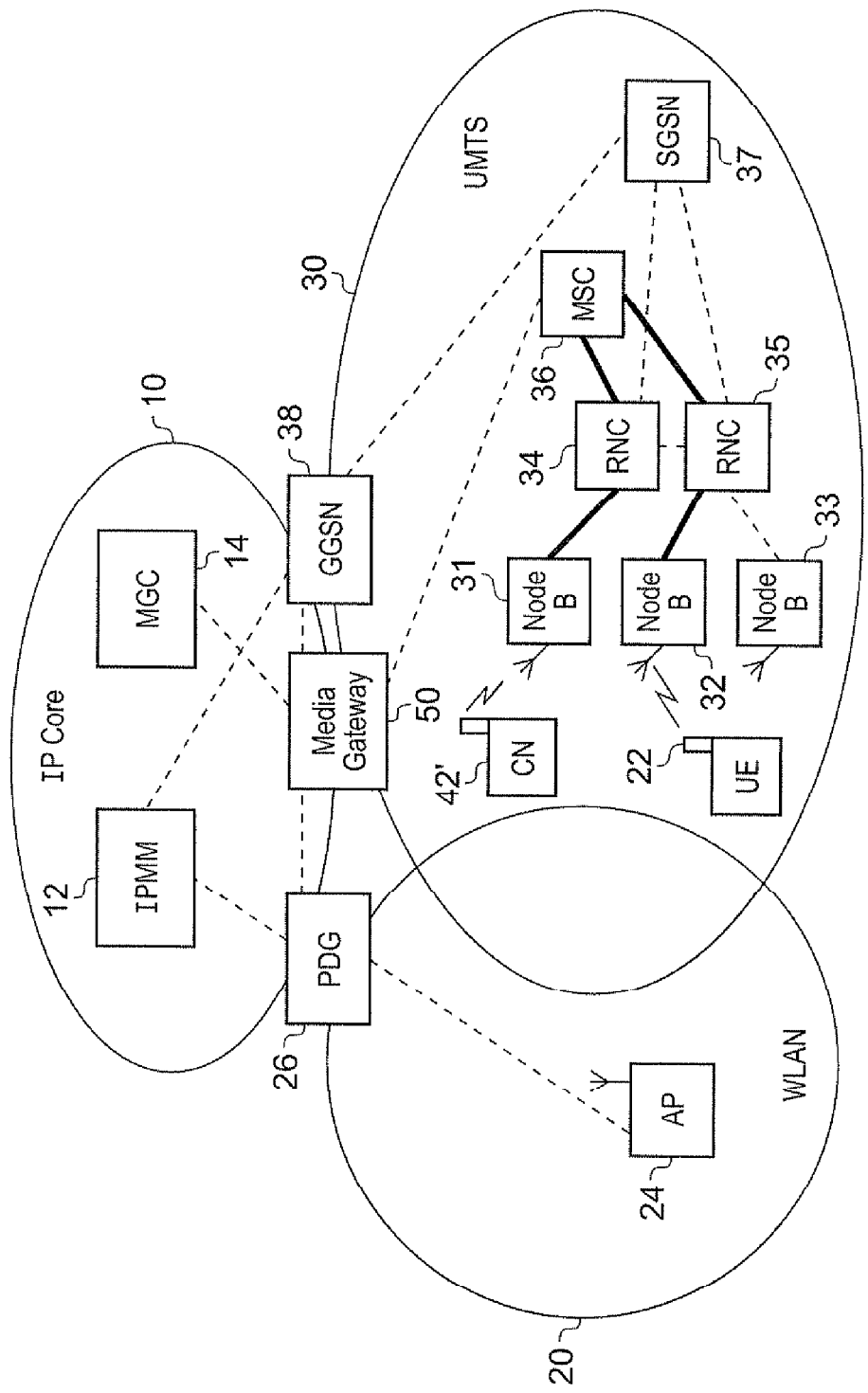

Referring to FIG. 3B, the telecommunications system of FIG. 3A is shown, but with the correspondent node 42 of FIG. 3A being replaced with a correspondent node 42' which is present in, and affiliated to, the UMTS network 30. That is, FIG. 3B illustrates the telecommunications system of FIGS. 1B and 2B for a state in which a hand-over of the communications session between the user equipment 22 and the correspondent node 42 from the WLAN 20 to the UMTS network 30 has been completed. Media data in this case is communicated between the UE 22 and the correspondent node 42' via the node B 32, the RNC 35, the MSC 36, the RNC 34 and the Node B 31.

Figure 4:
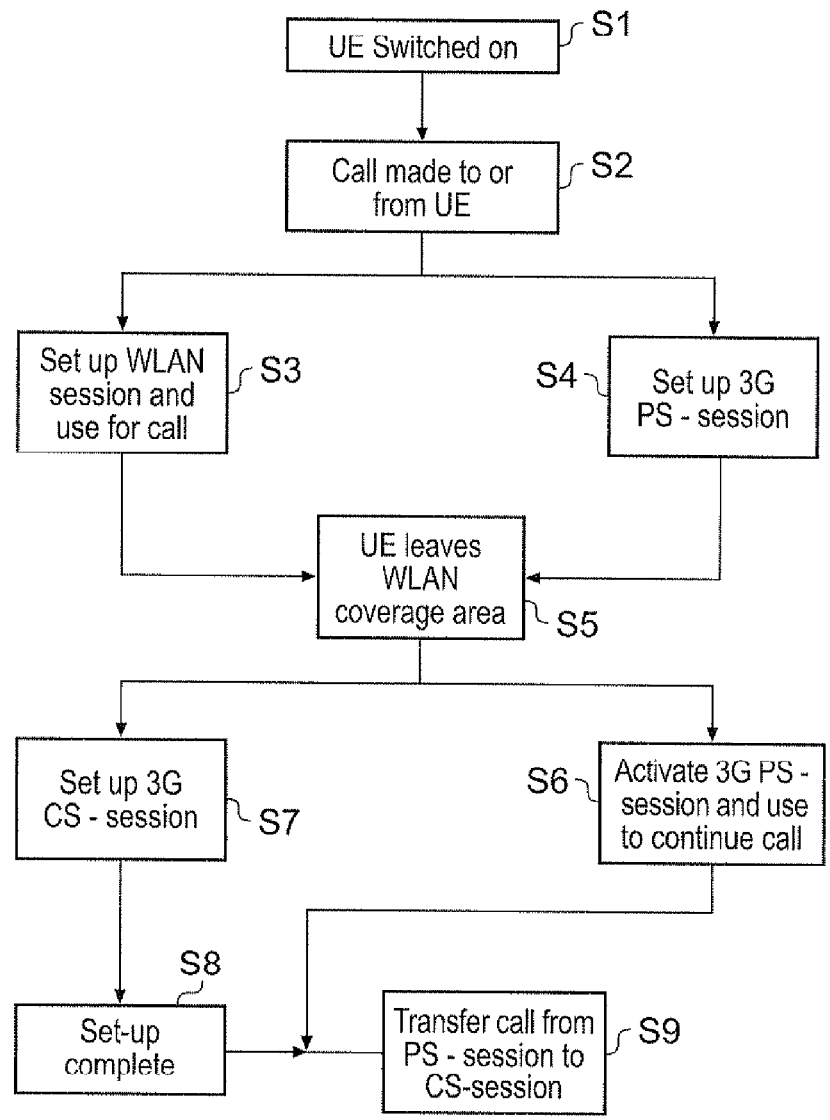
FIG. 4 is a schematic flow diagram illustrating a hand-over procedure according to an embodiment of the invention.

In FIG. 4, a flow diagram is provided which schematically illustrates an example hand-over procedure that can be used for the communications system of FIGS. 1A, 2A and 3A. At a step S1, the mobile user equipment 22 is switched on when in both a WLAN 20 and UMTS 30 coverage areas. At a step S2 a communications session is established either from the user equipment 22 or to the user equipment 22 to or from the correspondent node 42. As a result, at a step S3, the communications channel is established which causes the WLAN 20 to communicate media data. Meanwhile, at a step S4, a packet switched communications channel is set up on the UMTS network as a back up for the WLAN 20 in the event that a hand-over event should occur such as the mobile user equipment moving out of a coverage area of the WLAN. Subsequently, at a step S5, the user equipment 22 leaves the WLAN coverage area while the communications session is still in progress. To provide continuity of the call, the UMTS packet switched communication channel set up in step S4 is activated at a step S6. This activation step happens very quickly, so a dropped call should not result, nor should there be a severe discontinuity in the call. Meanwhile, at a step S7, a UMTS circuit switched communications channel is set up. This procedure is slower, typically requiring 4 to 6 seconds to complete. Once the set up of the circuit switched channel is completed at a step S8, the call is transferred from the packet switched channel to the circuit switched channel at a step S9.

As described above, to provide low delay communication of media data, a UMTS network communications channel should ultimately be provided using a circuit switched channel because the packet switched channel is limited in bandwidth and hence is not resource effective for the operator. However, until the circuit switched channel has been set up the packet switched channel can be used to provide continuity of service, albeit possibly at a lower quality or with some service limitation.

Figure 5:
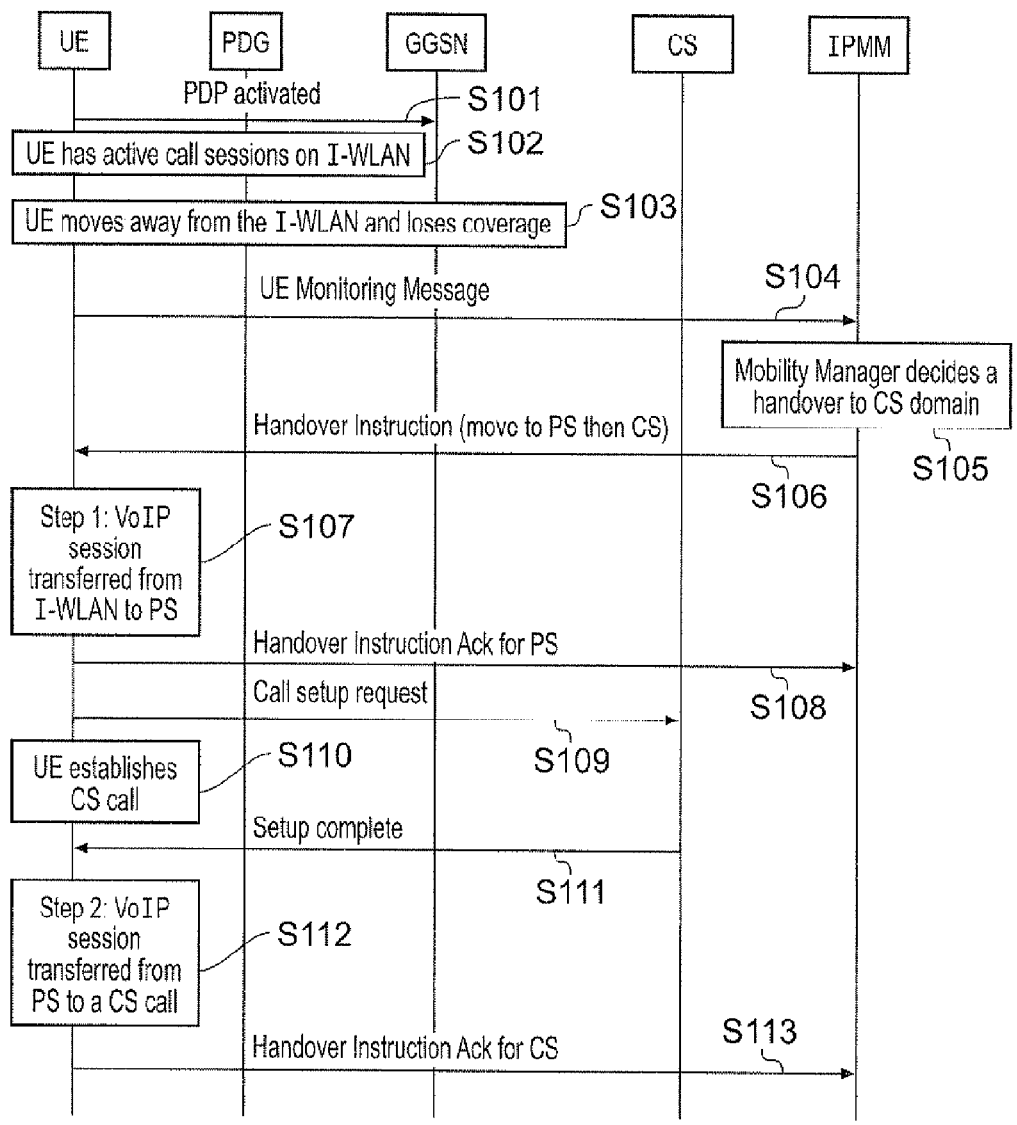
FIG. 5 schematically illustrates the signalling data flow involved in a network controlled hand-over procedure in accordance with an embodiment of the invention.

In FIG. 5 the signalling data flow involved in a network controlled communications session hand-over procedure is schematically illustrated. The functional network entities present in FIG. 5 are the User Equipment (UE), a packet data gateway (PDG), a Gateway GPRS Support Node (GGSN), a circuit switched network element (CS) and an internet protocol mobility manager (IPMM). The network controlled hand-over procedure uses an internet protocol mobility manager (IPMM) in the core network to control the hand-over from a WLAN to a circuit switched cellular network. The UE 22 and, if used, the IPMM requires a Packet Data Protocol (PDP) context to be activated at all times (wherever the user equipment is located, be it the WLAN IP domain or the CS domain) in order to exchange signalling messages which allow the decision and control of the hand-over. Accordingly, when a voice-over-IP (VoIP) session is running on an IP network (under WLAN coverage), a PDP context is activated on the packet switched UMTS interface of the UMTS network. Specifically, referring to FIG. 5, at a step S101 the user equipment communicates PDP context activation message to the GGSN in the UMTS network to activate the PDP context and establish a communications session using the packet switched channel of the UMTS network. As described above, no bandwidth will be used by this channel unless it is actually used to communicate media data. At a step S102, the user equipment has an active call session on the WLAN, however, at a step S103 the user equipment moves away from the WLAN and thereby loses coverage. After coverage has been lost, the user equipment communicates a monitoring message to the IPMM at a step S104. As a result of this message, the IPMM decides to hand-over the communications session to the circuit switched domain of the UMTS network at a step S105. A hand-over instruction is then issued back from the IPMM to the user equipment at a step S106. The hand-over procedure involves two main stages. The first stage, carried out at a step S107, is the transfer of the VoIP session from the WLAN to the packet switched domain of the UMTS network which has already been established in step S101 by the PDP context activation message. A hand-over instruction acknowledgement message is communicated from the user equipment to the IPMM at a step S108 to indicate that the user equipment has received the hand-over instruction from the IPMM and has performed the first stage of the transfer by switching to the packet switched domain. Concurrently with the transfer of the VoIP session to the packet switched domain, a call setup request is communicated from the user equipment to the circuit switched interface at a step S109 to establish a communications channel in the circuit switched domain. At a step S110 the user equipment establishes the circuit switched call, following which, at a step S111 the circuit switched interface communicates a setup complete message back to the user equipment. The second stage of the hand-over procedure occurs at a step S112 where the VoIP session is transferred from the packet switched domain of the UMTS network to the circuit switched domain of the UMTS network. Finally, at a step S113, the user equipment communicates a hand-over instruction acknowledgement message to indicate that the user equipment has performed the second stage of the transfer by switching to the circuit switched domain.

It will therefore be understood that the IPMM temporarily switches the communications session of the user equipment from the WLAN IP network to the packet switched UMTS interface of the cellular network using standard IPMM mechanisms. In other words, the VoIP/video session is switched from the WLAN VoIP/video channel to a packet switched UMTS VoIP/video channel. In parallel, the establishment of a call in the circuit switched UMTS domain is commenced. The packet switched UMTS VoIP/video channel lasts until the circuit switched session is established, then the call is switched from the packet switched UMTS VoIP/video session interface to the circuit switched cellular interface using standard 3GPP defined mechanisms. The packet switched VoIP/video channel can then be stopped.

Figure 6:
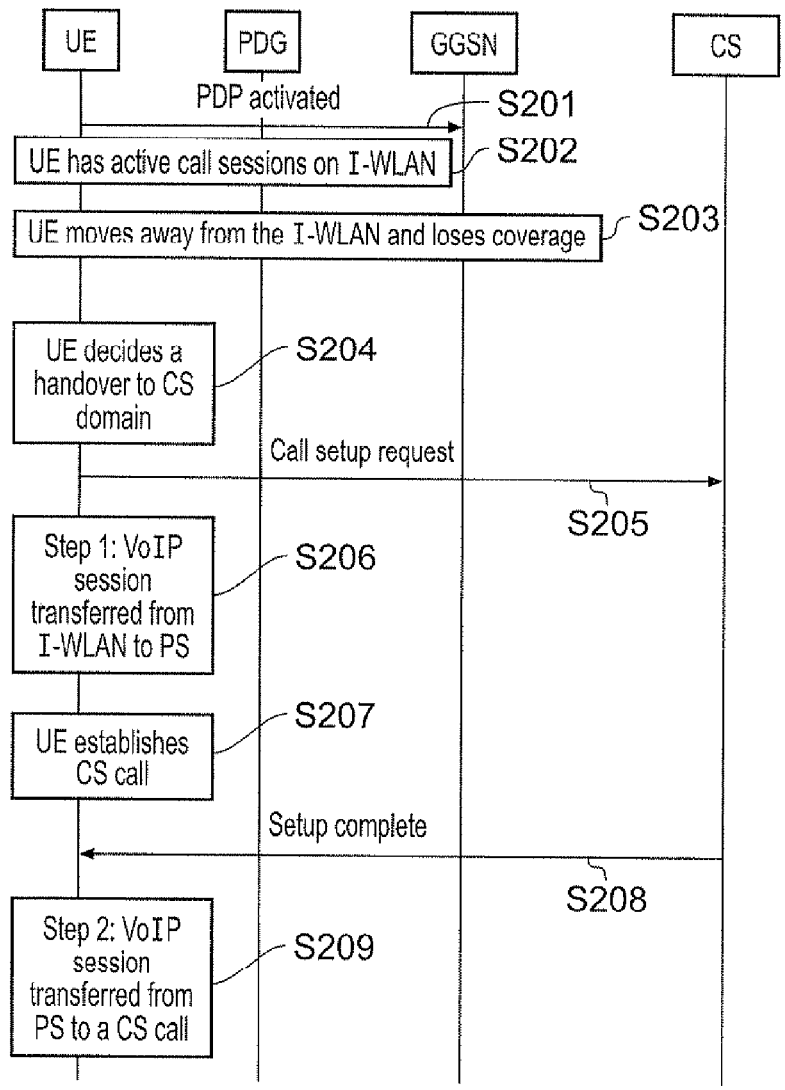
FIG. 6 schematically illustrates the signalling data flow for a hand-over procedure which is controlled by a mobile user equipment in accordance with an embodiment of the invention.

In FIG. 6 the signalling data flow involved in a mobile user equipment controlled communications session hand-over procedure is schematically illustrated. The functional network entities present in FIG. 6 are the User Equipment (UE), a packet data gateway (PDG), a Gateway GPRS Support Node (GGSN) and a circuit switched network element (CS). While FIG. 5 related to a network-controlled hand-over procedure, FIG. 6 relates to a mobile user equipment controlled hand-over procedure. Several of the initial steps of the two procedures are identical, in particular steps S201, S202 and S203 are identical with steps S101, S102 and S103 of FIG. 5, and shall not be repeated here. However, at a step S204 the network and mobile user equipment controlled procedures diverge, and in the mobile user equipment controlled procedure of FIG. 6 the user equipment decides for itself to hand over to the circuit switched domain of the UMTS network. As a result of this decision, a call setup request message is communicated from the user equipment to the circuit switched interface at a step S205 to initiate the set up process for the circuit switched domain. As with the network-controlled hand-over procedure, two stages are present. The first stage, at a step S206, is to transfer the VoIP session from the WLAN to the packet switched domain of the UMTS network which has already been established in the step S201 by the PDP context activation message. Following this, the user equipment establishes a circuit switched call at a step S207 and the circuit switched interface communicates a setup complete message to the user equipment at a step S208. At the second stage of the hand-over procedure, the VoIP session is transferred from the packet switched domain to the circuit switched domain.

Figure 7:
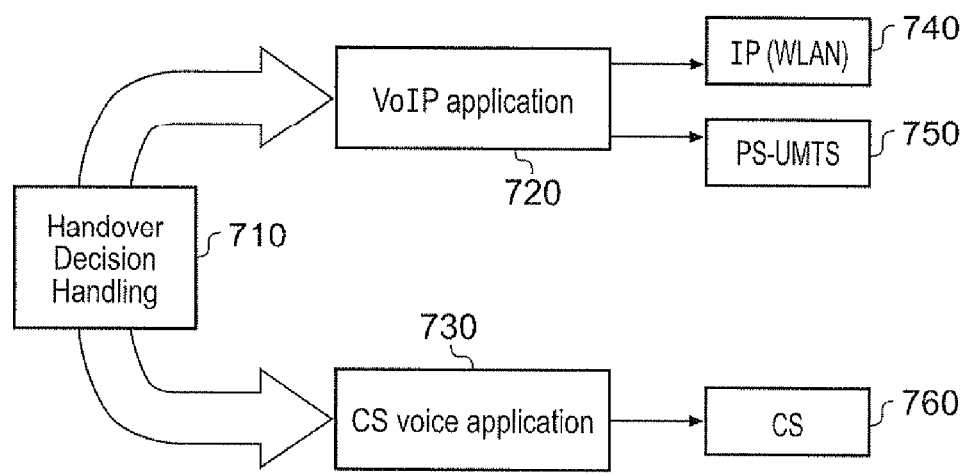
FIG. 7 schematically illustrates the functional architecture of a mobile user equipment which controls the hand-over procedure of FIG. 6.

In FIG. 7 the functional architecture of a mobile user equipment which controls the communications session hand-over procedure of FIG. 6 is schematically illustrated. Hand-over decision handling logic 710 is provided which performs the decision processing required to action the step S204 of FIG. 6. The hand-over decision handling logic 710 also selects an appropriate one of a VoIP application 720 and a circuit switched voice application 730 depending on the type of communications channel provided, and in particular in dependence on whether the communications channel is an IP-based channel or a circuit switched channel. When the VoIP application is selected, it will provide communications functionality with whichever IP-based communications channel is provided. This could be either an IP-based WLAN channel 740 or a packet switched UMTS channel 750. When the circuit switched voice application is selected, it will provide communications functionality with a circuit switched communications session 760.

Various modifications may be made to the embodiments described above without departing from the scope of the present invention. Various further aspects and features of the present invention are defined in the appended claims.

The invention claimed is:

1. A telecommunications system for providing mobile communications to mobile user equipment, the system comprising
   an internet protocol access network operable to provide a facility for mobile communications to mobile user equipment within a coverage area for wireless communication provided by the internet protocol access network, the mobile communications being provided using an internet protocol,
   a cellular mobile radio network operable to provide a facility for mobile communications to mobile user equipment within a coverage area for wireless communication provided by the cellular mobile radio network, the mobile communications being provided using a packet switched communications channel, in which data is divided into packets and communicated on a communications bearer shared with other data packets and a circuit switched communications channel in which data is communicated on a communications channel having a dedicated bandwidth, wherein a mobile user equipment is configured:
   to activate a connection on the cellular mobile radio network using the packet switched communications channel whilst receiving a communications service via the internet protocol access network,
   to communicate via the connection on the packet-switched channel of the cellular mobile radio network in response to a handover event for changing affiliation of the mobile user equipment from the internet protocol access network to the cellular mobile radio network,
   to establish a connection on the cellular mobile radio network using the circuit switched channel in response to and after the handover event in which the communication service via the internet protocol access network is lost,
   to continue to communicate via the connection on the packet-switched channel while the connection on the circuit-switched channel is being established, and
   to communicate via the connection on the circuit-switched channel once the circuit-switched channel has been established.

2. A telecommunications system according to claim 1, wherein the handover event is generated by the mobile user equipment.

3. A telecommunications system according to claim 1, comprising a internet protocol core network having a mobility manager, wherein the handover event is generated by the mobility manager.

4. A telecommunications system according to claim 1, wherein the communications service provides real-time communications between the mobile user equipment and other mobile user equipment.

5. A telecommunications system according to claim 1, wherein the connection on the cellular mobile radio network using the packet switched communications channel is established when the communications service provided via the internet protocol access network is established.

6. A mobile user equipment operable to access
   an internet protocol access network which provides a facility for mobile communications to mobile user equipment within a coverage area for wireless communication provided by the internet protocol access network, the mobile communications being provided using an internet protocol, and a cellular mobile radio network which provides a facility for mobile communications to mobile user equipment within a coverage area for wireless communication provided by the cellular mobile radio network, the mobile communications being provided using a packet switched communications channel, in which data is divided into packets and communicated on a communications bearer shared with other data packets and a circuit switched communications channel in which data is communicated on a communications channel having a dedicated bandwidth;

wherein the mobile user equipment is configured to:

to activate a connection on the cellular mobile radio network using the packet switched communications channel whilst receiving a communications service via the internet protocol access network, to communicate via the connection on the packet-switched channel of the cellular mobile radio network in response to a handover event for changing affiliation of the mobile user equipment from the internet protocol access network to the cellular mobile radio network, to establish a connection on the cellular mobile radio network using the circuit switched channel in response to and after the handover event in which the communication service via the internet protocol access network is lost, to continue to communicate via the connection on the packet-switched channel while the connection on the circuit-switched channel is being established, and to communicate via the connection on the circuit-switched channel once the circuit-switched channel has been established.

7. A telecommunications method for providing mobile communications to mobile user equipment via an internet protocol access network operable to provide a facility for mobile communications to mobile user equipment within a coverage area for wireless communication provided by the internet protocol access network, the mobile communications being provided using an internet protocol, and a cellular mobile radio network operable to provide a facility for mobile communications to mobile user equipment within a coverage area for wireless communication provided by the cellular mobile radio network, the mobile communications being provided using a packet switched communications channel, in which data is divided into packets and communicated on a communications bearer shared with other data packets and a circuit switched communications channel in which data is communicated on a communications channel having a dedicated bandwidth, the method comprising the steps of activating a connection on the cellular mobile radio network using the packet switched communications channel whilst receiving a communications service via the internet protocol access network, communicating via the connection on the packet-switched channel of the cellular mobile radio network in response to a handover event for changing affiliation of the mobile user equipment from the internet protocol access network to the cellular mobile radio network, establishing a connection on the cellular mobile radio network using the circuit switched channel in response to and after the handover event in which the communication service via the internet protocol access network is lost, continuing to communicate via the connection on the packet-switched channel while the connection on the circuit-switched channel is being established, communicating via the connection on the circuit-switched channel once the circuit-switched channel has been established.

8. A computer program stored on a non-transitory computer readable medium which when installed on a data processing apparatus will perform a method for providing mobile communications to mobile user equipment via:

an internet protocol access network operable to provide a facility for mobile communications to mobile user equipment within a coverage area for wireless communication provided by the internet protocol access network, the mobile communications being provided using an internet protocol, and a cellular mobile radio network operable to provide a facility for mobile communications to mobile user equipment within a coverage area for wireless communication provided by the cellular mobile radio network, the mobile communications being provided using a packet switched communications channel, in which data is divided into packets and communicated on a communications bearer shared with other data packets and a circuit switched communications channel in which data is communicated on a communications channel having a dedicated bandwidth, said method comprising acts of:

activating a connection on the cellular mobile radio network using the packet switched communications channel whilst receiving a communications service via the internet protocol access network, communicating via the connection on the packet-switched channel of the cellular mobile radio network in response to a handover event for changing affiliation of the mobile user equipment from the internet protocol access network to the cellular mobile radio network, establishing a connection on the cellular mobile radio network using the circuit switched channel in response and after to the handover event in which the communication service via the internet protocol access network is lost, continuing to communicate via the connection on the packet-switched channel while the connection on the circuit-switched channel is being established, communicating via the connection on the circuit-switched channel once the circuit-switched channel has been established.

* * * * *